(12) United States Patent
Doucet

(10) Patent No.: US 9,814,224 B2
(45) Date of Patent: Nov. 14, 2017

(54) LINE CUTTER FOR FISHING RODS

(76) Inventor: Matt Christopher Doucet, Rayne, LA (US)

( * ) Notice: Subject to any disclaimer, the term of this patent is extended or adjusted under 35 U.S.C. 154(b) by 377 days.

(21) Appl. No.: 13/162,136

(22) Filed: Jun. 16, 2011

(65) Prior Publication Data

US 2012/0317866 A1    Dec. 20, 2012

(51) Int. Cl.
*A01K 87/06* (2006.01)
*A01K 87/08* (2006.01)
*A01K 97/00* (2006.01)
*A01K 87/00* (2006.01)

(52) U.S. Cl.
CPC .......... *A01K 87/06* (2013.01); *A01K 87/007* (2013.01); *A01K 87/08* (2013.01); *A01K 97/00* (2013.01)

(58) Field of Classification Search
CPC ...... A01K 87/06; A01K 87/00; A01K 87/007; A01K 87/08; A01K 89/00; A01K 97/00
USPC ...... 43/18.1 R, 25, 23, 22, 4; D22/137, 149, D22/142
See application file for complete search history.

(56) References Cited

U.S. PATENT DOCUMENTS

| | | | | |
|---|---|---|---|---|
| 911,117 A * | 2/1909 | Crosier | .................. | A01K 97/06 43/22 |
| 2,561,289 A * | 7/1951 | Paris | ...................... | A01K 87/00 43/25 |
| 2,632,273 A * | 3/1953 | Fletcher | ................. | A01K 87/06 43/22 |
| 3,086,311 A * | 4/1963 | Hurst | ..................... | A01K 97/18 43/25 |
| 3,128,023 A * | 4/1964 | Cook | ..................... | A01K 97/00 43/25 |
| 3,312,989 A * | 4/1967 | Paolantonio | .......... | A01K 87/08 7/118 |
| 3,410,016 A * | 11/1968 | Arsenault | ............. | A01K 87/08 43/22 |
| 3,521,393 A * | 7/1970 | Gordon | .................. | A01K 87/00 43/25 |
| 3,732,644 A * | 5/1973 | Kavanagh | ............. | A01K 87/04 43/22 |
| 3,990,148 A * | 11/1976 | Rienzo, Sr. | ........... | A01K 87/00 30/287 |
| 4,023,299 A * | 5/1977 | Maserang | .............. | A01K 89/00 43/25 |
| 4,648,197 A * | 3/1987 | Weiberg, Jr. | .......... | A01K 97/00 43/25 |
| 4,703,578 A * | 11/1987 | Highby | .................. | A01K 87/00 43/18.1 R |
| 4,726,140 A * | 2/1988 | Mears | .................... | A01K 97/00 43/25 |

(Continued)

*Primary Examiner* — Darren W Ark
(74) *Attorney, Agent, or Firm* — Warner J. Delaune; Baker Donelson, et al.

(57) ABSTRACT

An improved line cutter for fishing rods is provided, comprising a reel seat having a base, wherein the base includes a trigger extending from the base. A slot is formed into the trigger, wherein the slot is adapted to accept a portion of fishing line. A blade with a cutting edge is positioned within the slot, and the cutting edge is exposed to cut the fishing line when the fishing line is pressed against the blade. An alternative design is also provided wherein the trigger is removable from the reel seat base. In the removable trigger, the entire trigger and blade assembly may be replaced, or a blade pocket inside the trigger permits retention and replacement of the blade alone.

4 Claims, 1 Drawing Sheet

(56) References Cited

U.S. PATENT DOCUMENTS

| | | | | |
|---|---|---|---|---|
| 4,730,409 A * | 3/1988 | Mitchell | A01K 97/00 43/25 |
| 4,750,287 A * | 6/1988 | Myers | A01K 87/08 43/18.1 R |
| 4,823,498 A * | 4/1989 | Banta | A01K 97/00 43/25 |
| 4,858,365 A * | 8/1989 | Struntz | A01K 87/08 43/22 |
| 4,869,011 A * | 9/1989 | Whiting | A01K 87/08 43/23 |
| 4,896,422 A * | 1/1990 | Sheehan | A01K 97/00 43/25 |
| D314,606 S * | 2/1991 | Banta | D22/149 |
| 5,012,607 A * | 5/1991 | Meschkat | A01K 87/08 43/25 |
| 5,025,585 A * | 6/1991 | Powell | B26B 27/00 43/25 |
| D325,240 S * | 4/1992 | Ellis | D22/149 |
| 5,182,874 A * | 2/1993 | Powell | B26B 27/00 43/25 |
| 5,247,760 A * | 9/1993 | Lowry | A01K 97/00 43/25 |
| 5,263,276 A * | 11/1993 | Washington | A01K 87/00 43/25.2 |
| 5,685,037 A * | 11/1997 | Fitzner | A01K 91/04 43/4 |
| 6,029,387 A * | 2/2000 | Swor | A01K 97/00 43/4 |
| 6,098,333 A * | 8/2000 | Wickizer | A01K 87/08 43/23 |
| 6,397,511 B1 * | 6/2002 | Atnip | A01K 87/007 43/22 |
| 6,679,199 B2 * | 1/2004 | Bankston | A01K 61/001 43/4 |
| 7,191,559 B1 | 3/2007 | Laceky | |
| 7,237,356 B1 * | 7/2007 | Reynolds | A01K 87/007 43/25 |
| 7,389,607 B2 * | 6/2008 | Zwierski | A01K 87/007 43/25 |
| D619,674 S * | 7/2010 | Marlin | D22/134 |
| 8,046,952 B2 * | 11/2011 | Hillhouse | A01K 87/06 43/25 |
| 2010/0299941 A1 * | 12/2010 | Marlin | A01K 97/00 30/296.1 |
| 2012/0144725 A1 * | 6/2012 | Marascalco | A01K 97/00 43/25 |
| 2013/0180157 A1 * | 7/2013 | Doucet | A01K 97/00 43/22 |

\* cited by examiner

LINE CUTTER FOR FISHING RODS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to devices for cutting fishing line, and more particularly to such devices which are attached to the fishing rod.

2. Description of Related Art

In the sport of fishing, it is frequently necessary to cut the fishing line. One example is when the fisherman needs to attach a lure to the line, wherein the previous lure is removed and a replacement lure is substituted in its place. Another example may be when there is a tangled or knotted line or other situation requiring a fresh length of line. Still another example is when excess line must be trimmed from the new lure.

These cutting operations can be troublesome, because they require a great deal of manual dexterity to use a pocket knife, fingernail trimmer, or even one's own teeth to cut the line, all the while holding the lure and tackle. Loose cutting devices like knives, trimmers, and other line cutters may be easily lost, and can be difficult to locate when they are needed. Such problems are only exacerbated by many other factors that may be present, such as sweaty hands, a crowded boat, wave action, and fishing at night.

Over the years, many devices have been developed for cutting fishing line. Some are portable, hand-held cutters, while others are attached to the fishing rod or reel themselves. Of those line cutters attached to the fishing rod, a number of patents are exemplary, namely U.S. Pat. No. 3,990,148 (Rienzo), U.S. Pat. No. 4,730,409 (Mitchell), U.S. Pat. No. 4,823,498 (Banta), U.S. Pat. No. 5,025,585 (Powell), U.S. Pat. No. 5,182,874 (Powell), and U.S. Pat. No. 7,389,607 (Zwierski). While each of those devices has its unique advantages and drawbacks, none of them are positioned on one of the most conspicuous parts of the casting rod, e.g. the reel seat trigger.

In the typical casting rod configuration, a two-part reel seat is affixed to the rod, which securely grips the base of the fishing reel by tightening a threaded portion against the base. Because the reel is present above the rod for casting, most reel seats include a "trigger" which extends below the rod. Thus, while holding the rod, and during the casting operation, the fisherman's index finger is placed on the trigger, while the remaining fingers are placed around the grip of the rod. This establishes a firm grasp of the rod, and it offers ambidextrous use by the fisherman.

In devising an improved line cutter, a number of design criteria should be met. First, the line cutter should be easily within reach of the fisherman. Second, the line cutter must be located in a position that permits quick placement of the line against the blade. Third, the line cutter must be safe to the fisherman by preventing accidental injury. For the reasons explained elsewhere herein, the trigger provides an ideal location for a line cutter while providing many advantages over prior patents.

SUMMARY OF THE INVENTION

Therefore, an improved line cutter for fishing rods is provided, comprising a reel seat having a base, wherein the base includes a trigger extending from the base; a slot formed into the trigger, wherein the slot is adapted to accept a portion of fishing line; and a blade having a cutting edge, wherein the blade is positioned within the slot, and wherein the cutting edge is exposed to cut the fishing line when the fishing line is pressed against the cutting edge.

The blade is preferably positioned transverse to the slot and is molded into the trigger, such that the blade is exposed along a rear surface of the trigger.

The blade is recessed within the slot to such an extent as to minimize accidental injury to a user.

Also provided is an improved line cutter, comprising a reel seat having a base, wherein the base includes a mounting receptacle for attaching a trigger; a trigger having a mounting portion, wherein the mounting portion is adapted to matingly and detachably engage the mounting receptacle of the base; a slot formed into the trigger, wherein the slot is adapted to accept a portion of fishing line; and a blade having a cutting edge, wherein the blade is positioned within the slot, and wherein the cutting edge is exposed to cut the fishing line when the fishing line is pressed against the cutting edge.

Preferably, the mounting receptacle includes one or more guide rails, and wherein the mounting portion of the trigger slides into a predetermined position on the base.

The detachable trigger includes a blade pocket adapted to retain the blade, and adapted to permit removal and replacement of the blade by the user.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
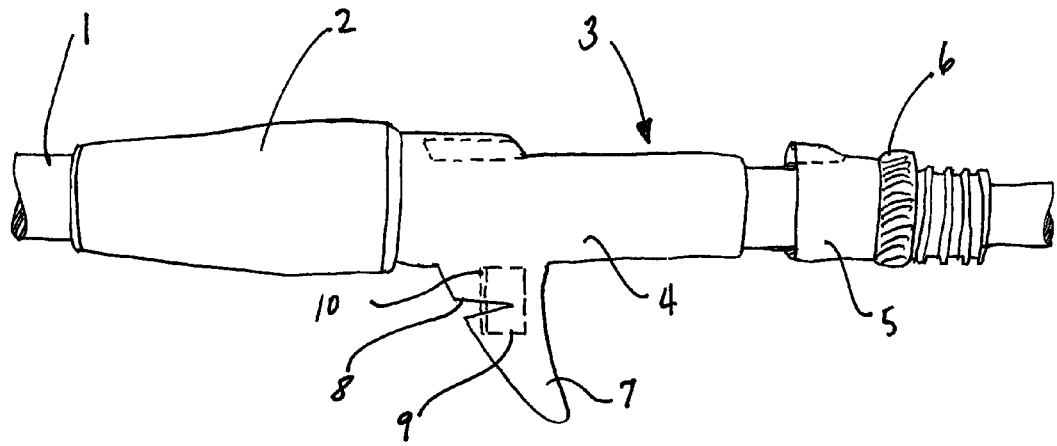
FIG. 1 shows a side view of a typical casting rod modified in accordance with a preferred embodiment of the present invention.

Turning now to FIG. 1, a preferred embodiment of the invention in the form of a permanently installed line cutter is shown in conjunction with an otherwise conventional fishing rod 1. The rod 1 includes a grip 2 and a reel seat 3. The reel seat 3 includes a base 4, a movable clamp 5, and a threaded nut 6. The base 4 of the reel seat 3 includes a trigger 7 extending from the base 4. The trigger 7 is generally a curved member intended to accommodate the user's index finger when holding the rod 1 and casting a lure.

The trigger 7 includes a slot 8 formed into the trigger 7, preferably on a rear surface of the trigger 7. The slot 8 is adapted to accept a portion of fishing line (now shown) during a line cutting operation as further explained below. The slot 8 includes a blade 9 having a cutting edge 10 positioned preferably transverse to the slot 8. Thus, the cutting edge 10 is exposed to cut the fishing line when the fishing line is pressed against the cutting edge 10. The reel seat and trigger are preferably constructed of plastic materials typically used for rod components of this type. The blade 9 should be constructed from a metal or other material that is resistant to the effects of corrosion, and particularly from corrosion due to exposure to salt water environments.

In the preferred embodiment, the blade 9 is positioned within the trigger 7 during the molding process, such that the cutting edge 10 is exposed within the slot 8. Preferably, the blade 9 is recessed within the slot 8 to such an extent as to minimize accidental injury to a user.

Figure 2:
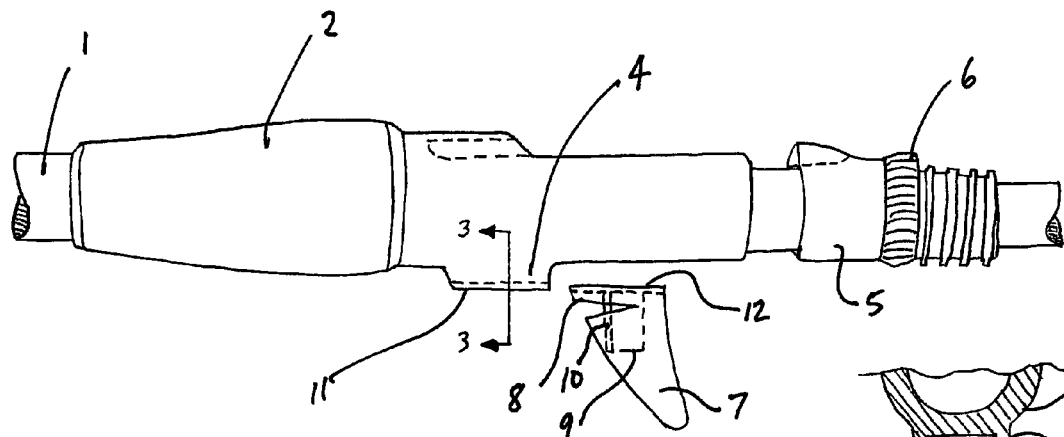
FIG. 2 shows a side view of an alternate embodiment of the invention in which the trigger is detachable.

FIG. 2 depicts an alternative embodiment of the invention, but one in which the trigger 7 is detachable from the base 4. In this embodiment, the base 4 includes a mounting receptacle 11 in the form of one or more "dove tail" guide rails, shown best in the sectional view of FIG. 3. A detachable trigger 7 includes a mounting portion 12 which is adapted to matingly and detachably engage the mounting receptacle 11 of the reel seat base 4. When the trigger 7 is attached to the base 4, the mounting portion 12 of the trigger 7 is caused to slidably engage the mounting receptacle 11 of the base 4 until the trigger 7 reaches a predetermined position. In most cases, it is desirable that the trigger 7 be stopped in its travel rearward at the point where the front and rear trigger surfaces are flush with the surfaces of the base 4. Thus, the mounting receptacle 11 and mounting portion 12 include means for retaining the trigger 7 in its final position for use. It will be appreciated that the aforementioned mounting method for the trigger 7 is only one of many possible methods. For example, the trigger 7 may be attached and removed by other common mating structures, including clips, snaps, locking pins, and similar devices, all with equal effectiveness and without departing from the basic design of having a mounting receptacle on the reel seat base 4 and mounting portion on the trigger 7.

Figure 3:
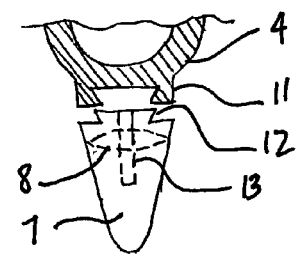
FIG. 3 shows a partial section view of the embodiment of FIG. 2.

As depicted in FIG. 3, the trigger 7 further includes a blade pocket 13 adapted to retain the blade 9, and also adapted to permit removal and replacement of the blade 9 by the user. Thus, when the cutting edge 10 of the blade 9 becomes dull, the trigger 7 can be easily slid from its mounted position, and the blade 9 within the blade pocket 13 is removed. A replacement blade 9 is then inserted into the blade pocket 13, and the trigger 7 is quickly reattached to the base 4 of the reel seat 3. Alternatively, the blade 9 can be molded into the trigger 7 as in the embodiment of FIG. 1, such that the entire trigger and blade assembly can be removed and replaced by a new trigger and blade assembly.

Except for the removable trigger 7 and its features, all other features of the alternative embodiment are otherwise identical to the features of the preferred embodiment of FIG. 1.

It should be appreciated that variations of the present invention may be made on other portions of the reel seat 3. While the trigger 7 provides the ideal location for a line cutter, similar blade positions are possible in a number of other places.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. An assembly with an improved line cutter for fishing rods, comprising:
   (a) a reel seat adapted to surround and receive a fishing rod therethrough, wherein the reel seat extends forward from a rod grip and includes a base, a movable clamp, and a threaded nut adapted to urge the clamp against a fishing reel on a first side of the base;
   (b) wherein the base includes a trigger extending from a second side of the base opposite the first side such that a length of the trigger extends transverse to a longitudinal axis of the reel seat, wherein the trigger is a curved member having:
      (i) a front trigger surface adapted to conform to a finger of a user; and
      (ii) a rear trigger surface opposite the front trigger surface;
   (c) a slot formed into the rear trigger surface, wherein the slot is adapted to accept a portion of fishing line; and
   (d) a blade having a cutting edge, wherein the blade is positioned within the slot, and wherein the cutting edge is exposed in a direction opposite to which the front trigger surface faces to cut the fishing line when the fishing line is pressed against the cutting edge.

2. The assembly with the improved line cutter of claim 1 wherein the blade is positioned transverse to the slot.

3. The assembly with the improved line cutter of claim 1 wherein the blade is molded into the trigger.

4. The assembly with the improved line cutter of claim 1 wherein the blade is recessed within the slot to such an extent as to minimize accidental injury to a user.

\* \* \* \* \*